United States Patent
Zhang et al.

(10) Patent No.: US 10,241,998 B1
(45) Date of Patent: Mar. 26, 2019

(54) METHOD AND SYSTEM FOR TOKENIZING DOCUMENTS

(71) Applicant: EMC Corporation, Hopkinton, MA (US)

(72) Inventors: Lei Zhang, Shanghai (CN); Chao Chen, Shanghai (CN); Jingjing Liu, Shanghai (CN); Kunwu Huang, Shanghai (CN); Hongtao Dai, Shanghai (CN); Ying Teng, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 55 days.

(21) Appl. No.: 15/197,338

(22) Filed: Jun. 29, 2016

(51) Int. Cl.
*G06F 17/22* (2006.01)
*G06F 17/27* (2006.01)

(52) U.S. Cl.
CPC ............ *G06F 17/277* (2013.01); *G06F 17/22* (2013.01)

(58) Field of Classification Search
CPC .................................................... G06F 17/277
USPC ......................................................... 715/264
See application file for complete search history.

(56) References Cited

U.S. PATENT DOCUMENTS

| | | | | |
|---|---|---|---|---|
| 6,047,283 A * | 4/2000 | Braun | ............... | G06F 17/30625 |
| 6,263,333 B1 * | 7/2001 | Houchin | ................. | G06F 17/27 |
| 6,466,901 B1 * | 10/2002 | Loofbourrow | ...... | G06F 17/2755 704/9 |
| 9,348,809 B1 * | 5/2016 | Zhao | ...................... | G06F 17/278 |
| 2008/0010271 A1 * | 1/2008 | Davis | ................ | G06F 17/30625 |
| 2009/0083266 A1 * | 3/2009 | Poola | ................ | G06F 17/30864 |
| 2013/0179147 A1 * | 7/2013 | Alkharashi | .......... | G06F 17/2217 704/8 |
| 2014/0222870 A1 | 8/2014 | Zhang | | |
| 2017/0068655 A1 * | 3/2017 | Wang | .................... | G06F 17/277 |

OTHER PUBLICATIONS

Hoffman, P. and F. Yergeau, "UTF-16, an encoding of ISO 10646", RFC 2781, DOI 10.17487/RFC2781, Feb. 2000, https://www.rfc-editor.org/info/rfc2781 (Year: 2000).*
Paul E. Black, "binary search tree", in Dictionary of Algorithms and Data Structures [online], Vreda Pieterse and Paul E. Black, eds. Jan. 26, 2015. (accessed May 11, 2018) Available from: https://www.nist.gov/dads/HTML/binarySearchTree.html (Year: 2015).*
Mcnamee, Paul, and James Mayfield. "Character n-gram tokenization for European language text retrieval." Information retrieval 7, No. 1-2 (2004): 73-97. (Year: 2004).*

* cited by examiner

*Primary Examiner* — Frank D Mills
(74) *Attorney, Agent, or Firm* — Chamberlain, Hrdlicka, White, Williams & Aughtry

(57) ABSTRACT

A method for tokenizing documents. The method includes obtaining a document comprising text to be tokenized, isolating a first string of consecutive characters in the document, searching, in a token tree, for an expression that matches the first string, making a determination that a matching expression exists in the token tree and, based on the determination, storing the matching expression as an extracted token.

16 Claims, 7 Drawing Sheets

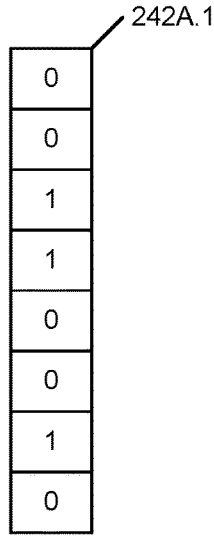
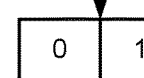
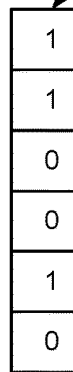
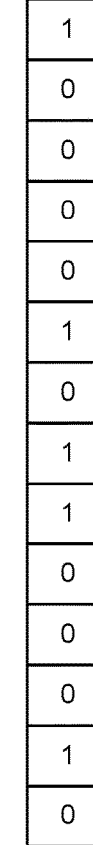
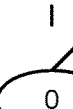
FIG. 2A
FIG. 2B

METHOD AND SYSTEM FOR TOKENIZING DOCUMENTS

BACKGROUND

Applications such as text searches and natural language processing may require tokenization of text documents. The tokenization of multilingual text documents may be particularly challenging.

BRIEF DESCRIPTION OF DRAWINGS

FIGS. 2A-2D show exemplary data representations, in accordance with one or more embodiments of the technology.

DETAILED DESCRIPTION

Figure 1:
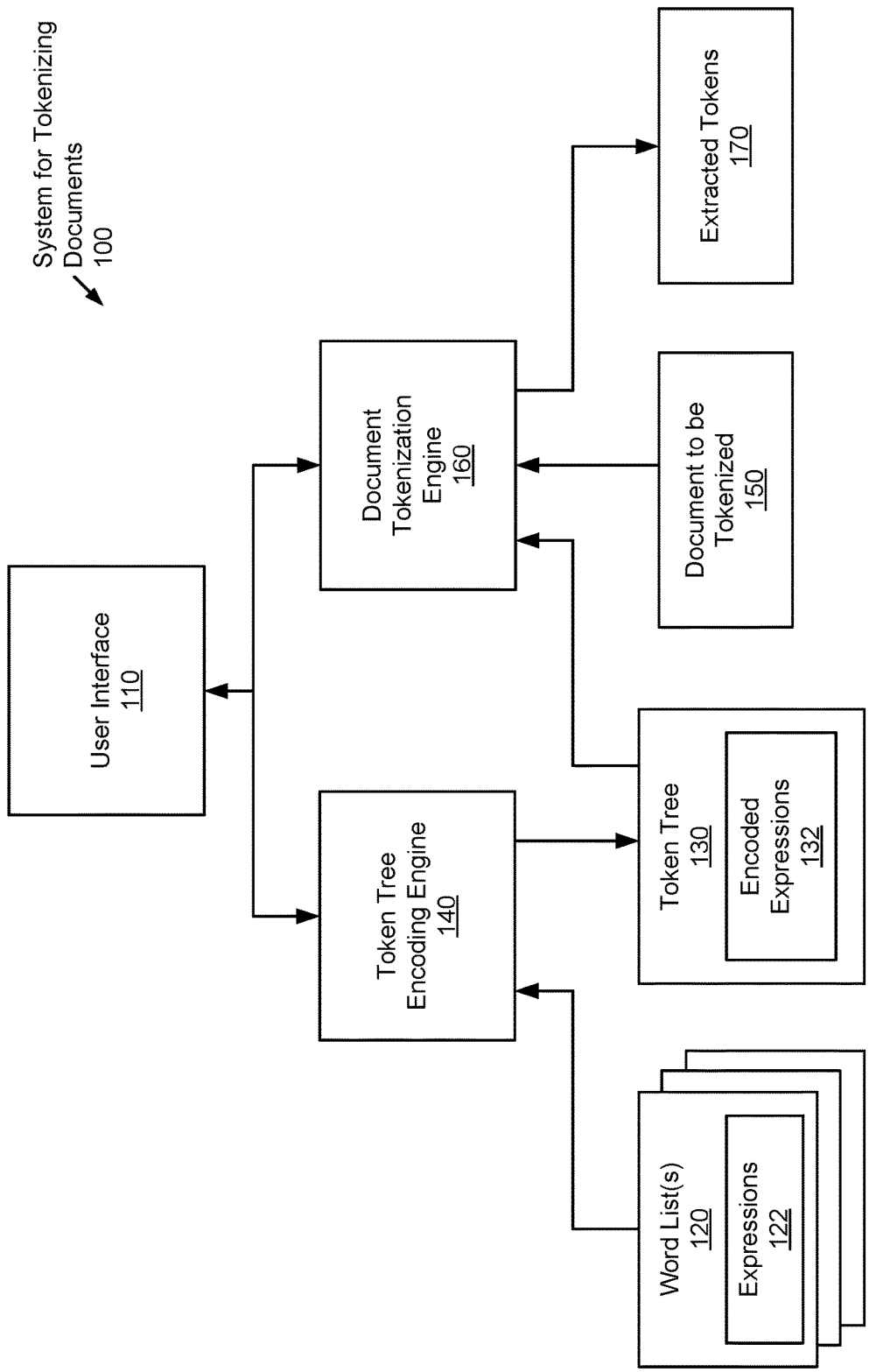
FIG. 1 shows a system, in accordance with one or more embodiments of the technology.
Figure 2C:
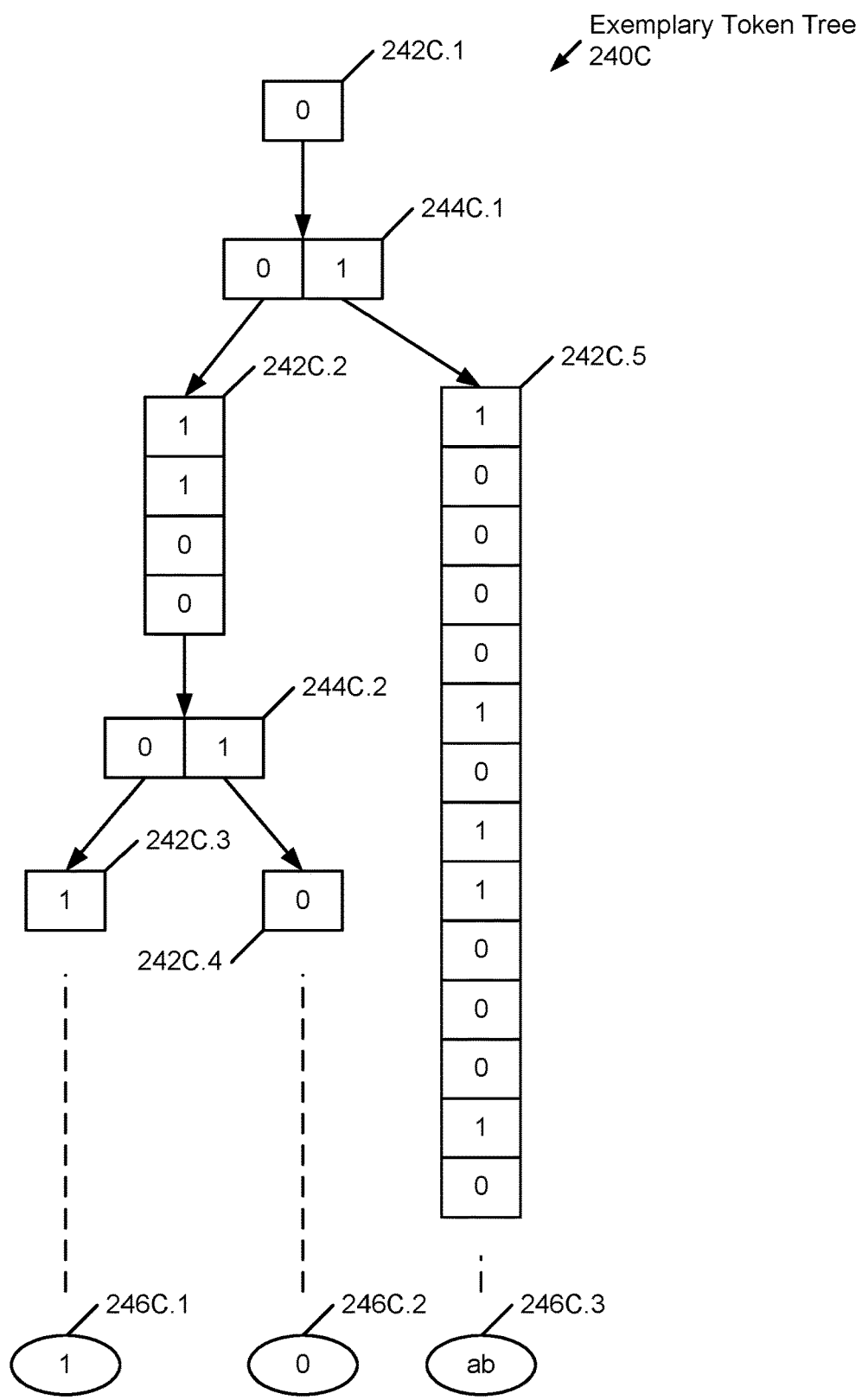
Figure 2D:
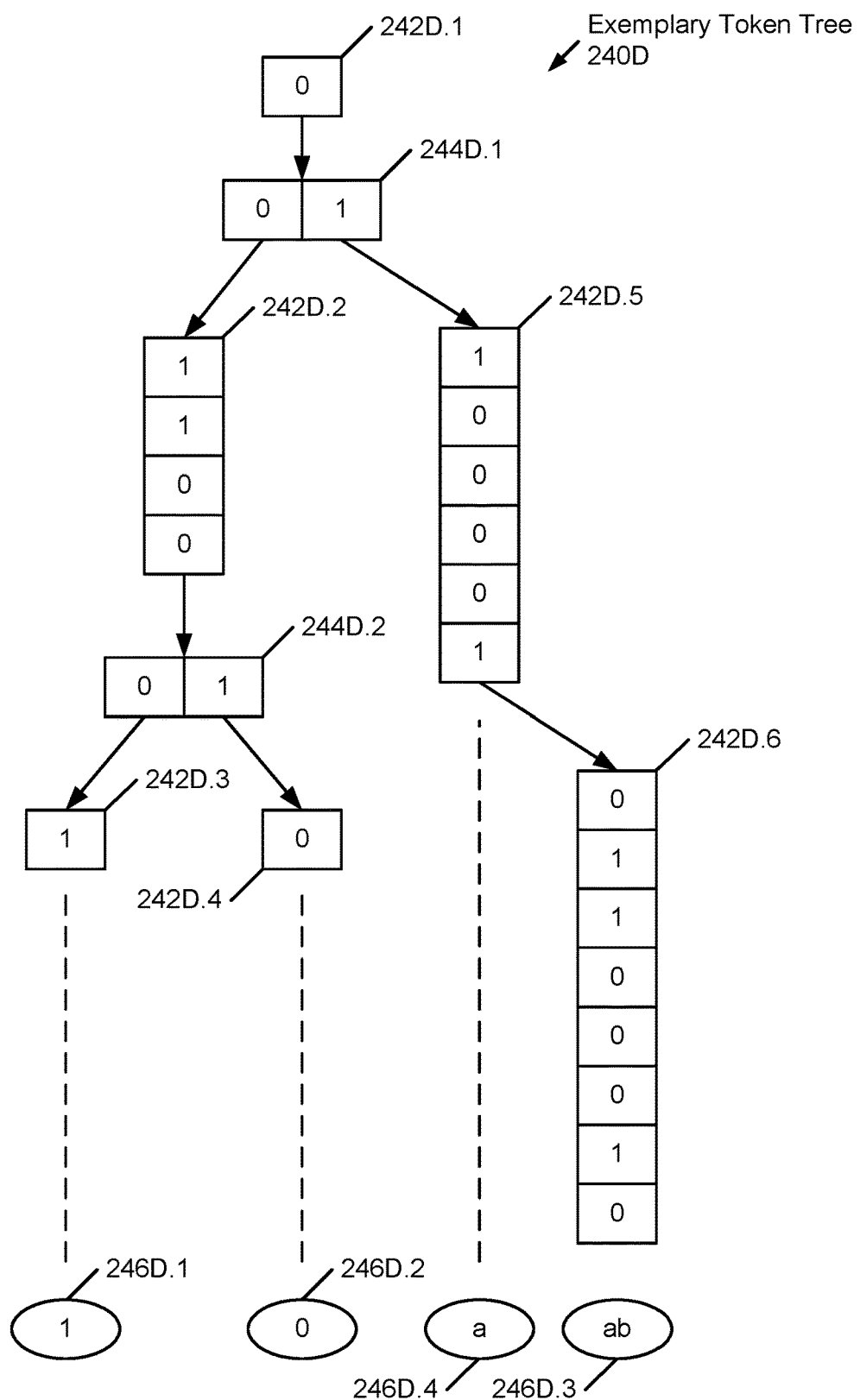

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology are directed to methods and systems for tokenizing text documents. More specifically, methods and systems in accordance with one or more embodiments of the technology are suitable for the tokenization of mixed language documents. A document to be tokenized may, for example, include English and Chinese language text content. The methods may be employed to break the text content into meaningful units such as basic expressions including words, word fragments, syllables, etc., e.g., in preparation for a natural language processing operation to be performed.

In one or more embodiments of the technology, the tokenization is performed by searching the document to be tokenized for expressions that qualify as tokens. In one or more embodiments of the technology, the search is performed by isolating strings from the document to be tokenized, and by searching a tree-like data structure for the existence of expressions that match these strings. If matching expressions are found, they are reported as tokens.

FIG. 1 shows a schematic diagram of a system in accordance with one or more embodiments of the technology. Specifically, FIG. 1 shows a system for tokenizing documents (100). The system may include a user interface (110), one or more word lists (120), a token tree (130), a token tree encoding engine (140), a document to be tokenized (150), a document tokenization engine (160), and extracted tokens (170). Each of these components is described in detail below.

In one or more embodiments of the technology, a user may access the user interface (110) in order to initiate and control the tokenization of a document to be tokenized (150). The user interface may enable the user to specify the document to be tokenized, for example, by uploading the document to be tokenized, or by selecting the document to be tokenized from a set of documents that are accessible via the user interface. The user interface (110) may further enable the user to select one or more word lists (120) from a set of word lists, based on which the tokenization is to be performed, as described with reference to FIGS. 3 and 4. In addition, the user interface (110) may be used to present the extracted tokens (170) (i.e., the tokens extracted from the document to be tokenized (150)) to the user. The extracted tokens (170) may be presented to the user, for example, in the form of a list of tokens displayed in the user interface, or stored in a file. The user interface may further establish an interface to other processing modules that rely on the extracted tokens, e.g., a natural language processing module.

Figure 5:
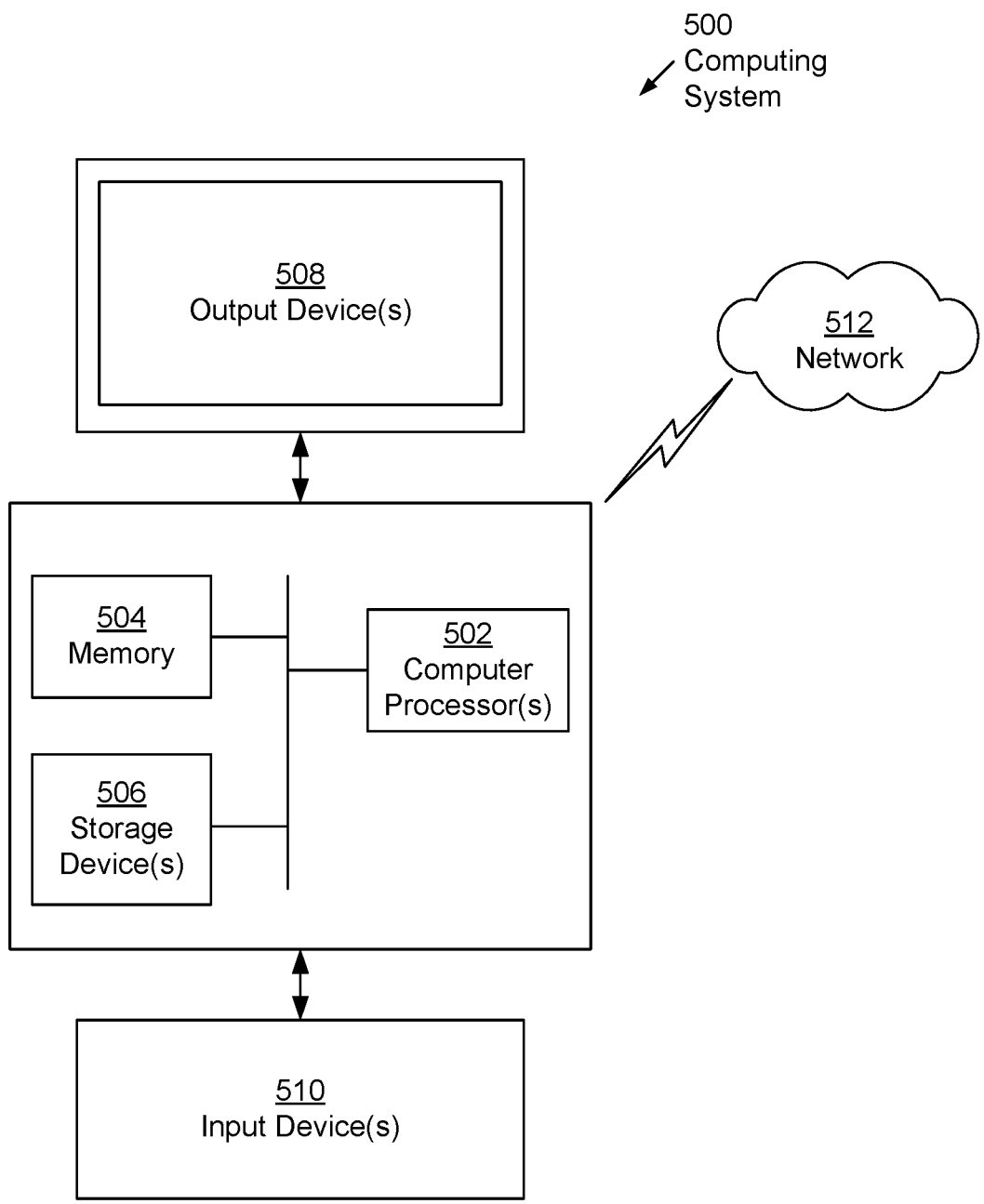
FIG. 5 shows a computing system in accordance with one or more embodiments of the technology.

The user interface, in accordance with one or more embodiments of the technology, may be executing on a computing device similar to the exemplary computing device shown in FIG. 5. In one or more embodiments of the technology, the user interface is operatively connected with the token tree encoding engine (140) and/or the document tokenization engine (160).

Continuing with the discussion of FIG. 1, the system (100) further includes one or more word lists (120). A word list, in accordance with one or more embodiments of the technology, includes expressions (122) that, if detected in the document to be tokenized (150), are reported as extracted tokens (170). An expression may be a word, a name, a phrase, a syllable, etc. In one or more embodiments of the technology, the word lists (120) may include expressions in different languages. For example, a first word list may include English expressions, a second word list may include Chinese expressions, and a third word list may include Korean expressions.

Those skilled in the art will recognize that any number of word lists may be used, and a word list may include expressions in any language. Further, multiple word lists with expressions in the same language may exist without departing from the technology. For example, one word list may include English language engineering terms, and another word list may include English language medical terms.

A word list (120) may be implemented using any format suitable for the storage of expressions (122) in a particular language. The word list may be, for example, a text file, a spreadsheet, or any other type of collection of data. The encoding of the expressions (122) in a word list (120) may be specific to a particular language, or an encoding suitable for multiple languages may be used. For example, expressions (122) may be encoded using the 16-bit Unicode Transformation Format (UTF-16).

The word list(s) (120) may be stored on any type of non-volatile (or persistent) storage, including, for example, a hard disk drive, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM). Further, the content database may be implemented using a redundant array of independent disks (RAID), network attached storage (NAS), cloud storage, etc. Further, at least some of the content of the data repository may alternatively or in addition be stored in volatile memory, e.g., Dynamic Random-Access Memory (DRAM), Synchronous DRAM, SDR SDRAM, and DDR SDRAM.

Continuing with the discussion of FIG. 1, the system (100) further includes a token tree (130). The token tree, in accordance with one or more embodiments of the technology includes encoded expressions (132). An encoded expression is an expression (122), obtained from a word list (122), that is stored in the token tree. The token tree (130) may include any number of encoded expressions (132). In one embodiment of the technology, the token tree (130) includes all encoded expressions (132) that correspond to expressions (122) in selected word lists. For example, if a word list A, a word list Y, and a word list Z are selected from a pool of word lists, all expressions (122) of word lists A, Y, and Z, but not expressions from other word lists, are included in the token tree (130).

In one or more embodiments of the technology, a common format, e.g. UTF-16, is used for all encoded expressions (132) in the token tree (130). The use of UTF-16 may enable the representation of different-language expressions in the token tree. For example, some encoded expressions may be English-language expressions, whereas other encoded expressions may be Chinese and/or Korean-language expressions.

An encoded expression (132), in accordance with one or more embodiments of the technology, is stored in the token tree (130) using a binary search tree representation, further described below, with reference to FIGS. 2A-2D. The token tree (130) may thus include a binary search tree, built from expressions (122) that may be obtained from one or more of the word lists (120).

Continuing with the discussion of FIG. 1, the system (100) further includes a token tree encoding engine (140). In one or more embodiments of the technology, the token tree encoding engine executes software instructions in the form of non-transitory computer readable program code described in detail below, with reference to FIG. 3. The instructions may enable the token tree encoding engine (140) to generate a token tree (130) including encoded expressions (132) from the expressions (122) in the word lists (120). The token tree encoding engine (140) may execute on a computing device that may be similar to the exemplary computing device shown in FIG. 5, and may be any type of mobile, desktop, server, embedded, or other hardware capable of performing at least one of the steps described below with reference to FIG. 3.

The system (100) also includes a document to be tokenized (150). The document to be tokenized may be any kind of document that includes text that requires tokenization. Tokenization may be necessary, for example, to perform natural language processing operations on the document to be tokenized. The document to be tokenized (150) may be selected by a user or by another process that requires the tokenization of the document.

The document to be tokenized may be of any file format including, for example, plain text (.txt), Microsoft® Word (.doc, .docx), Adobe® Acrobat (.pdf), etc. Those skilled in the art will appreciate that the technology is not limited to the aforementioned protocols. Rather, any file that may contain text, either exclusively, or in combination with non-text content (e.g. CAD files), regardless of the file format, may be processed. Further, the document to be tokenized may be a mixed language document. For example, the document to be tokenized may include English, Korean, and Chinese language elements. In this case, the document to be tokenized may rely on an encoding suitable for the representation of multilingual documents, such as UTF-16.

The document to be tokenized may be individually stored, or it may be kept in a document repository (not shown), along with other archived documents. The document repository may be any type of document storage suitable for storing at least one document to be tokenized. The document repository may be, for example, an enterprise content management system, a database, a folder or a group of folders on a storage device. The archived document repository may be local, i.e., it may be located on the computing device on which the user interface is executing, or it may be remote, e.g., located on a physical server. The document repository may be stored on any type of non-volatile storage, including, for example, a hard disk drive, a redundant array of independent disks (RAID), network attached storage (NAS), cloud storage, etc. Further, at least some of the content of the document repository may alternatively or additionally be stored in volatile memory, e.g., in RAM.

Continuing with the discussion of FIG. 1, the system (100) further includes a document tokenization engine (160). In one or more embodiments of the technology, the document tokenization engine (160) executes software instructions in the form of non-transitory computer readable program code described in detail below, with reference to FIG. 4. The instructions may enable the document tokenization engine (160) to generate a collection of extracted tokens (170) by screening the document to be tokenized (150) for expressions encoded in the token tree (130). The document tokenization engine (160) may execute on a computing device that may be similar to the exemplary computing device shown in FIG. 5, and may be any type of mobile, desktop, server, embedded, or other hardware capable of performing at least one of the steps described below with reference to FIG. 4.

The system (100) also includes the extracted tokens (170). Extracted tokens, in accordance with an embodiment of the technology, are expressions encoded in the token tree (130) that were found to exist in the document (150). Accordingly, an extracted token may be a word, a name, a phrase, a syllable, etc. existing in the word lists (120) being relied upon for building the token tree. Extracted tokens may be reported by the document tokenization engine (160), as they are detected, or in batches. A batch of extracted tokens may be in the format of a list, a spreadsheet, or in any other type of data collection format.

The extracted tokens (170) may be stored on any type of non-volatile (or persistent) storage, including, for example, a hard disk drive, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM). Further, the content database may be implemented using a redundant array of independent disks (RAID), network attached storage (NAS), cloud storage, etc. Further, at least some of the content of the data repository may alternatively or in addition be stored in volatile memory, e.g., Dynamic Random-Access Memory (DRAM), Synchronous DRAM, SDR SDRAM, and DDR SDRAM. Alternatively or additionally, the extracted tokens may be provided to another process that expects the extracted tokens as an input. Such a process may be, for example, a natural language processing application.

While FIG. 1 shows one exemplary configuration of a system for tokenizing documents, those skilled in the art will appreciate that systems for tokenizing documents may be configured differently, without departing from the technology. For example, the token tree encoding engine (140) and the document tokenization engine (160) may form a single engine. The token tree encoding engine (140) and/or the document tokenization engine (160) may execute on a local computing device and/or on a remote (e.g., cloud-based or data center-based) computing device. The token tree encoding engine (140) and the document tokenization engine (160) may be implemented on a distributed system and/or may be available as a service. If components of the system are distributed, the components may be connected via a network (e.g., a local area network (LAN), a wide area network (WAN) such as the Internet, mobile network, or any other type of network) enabling the components, including the user interface, the token tree encoding engine and the document tokenization engine to communicate. The network may implement any combination of wired and/or wireless communication protocols. The communication between the components of the system (100) may include any combination of secured (e.g., encrypted) and non-secured (e.g., un-encrypted) communication. The manner in which the components of the system communicate may vary based on the implementation of the technology.

In addition, a system for tokenizing documents may include an interface to other processes such as natural language processing applications. This interface may be implemented in the form of an Application Programming Interface (API) that may be available in lieu of the user interface (110) or in addition to the user interface.

FIGS. 2A-2D, show exemplary token trees in accordance with an embodiment of the technology. The exemplary token trees are binary search trees that include expressions obtained from word lists. FIGS. 2A-2D illustrate how a token tree may be constructed by stepwise addition of expressions. While the initial token tree (240A) in FIG. 2A only encodes the expression "0", the token trees (240B-240D) encode additional expressions that have been added to the initial token tree (240A).

The exemplary token trees (240A-240D) are organized from top to bottom, i.e., by descending through the token tree, one may read the bit sequences of characters that form an expression. Depending on what branch of the token tree is read, a particular expression is obtained. Accordingly, the number of branches at the bottom of the token tree corresponds to the number of distinct expressions in the token tree.

A token tree, in accordance with an embodiment of the technology, includes key nodes and branch nodes. A key node may be a single bit or a series of consecutive bits. Key nodes may be used to represent single or consecutive bits of an expression, where no branching is encountered. Accordingly, a key node may have any length, ranging from a single bit to the entire length of an expression (if only a single expression is stored in the binary search tree, and no branching therefore occurs). The use of key nodes is subsequently described with reference to FIGS. 2A-2D.

Bit locations in the token tree where branching occurs are represented by branch nodes. Branch nodes are necessary in scenarios in which one expression requires a bit at a particular location to be "1", whereas another expression requires the bit at the same location to be "0". Accordingly, based on the binary representation used for establishing token trees, in accordance with one or more embodiments of the technology, a branch node includes the bits "0" and "1".

An additional branch is added to a token tree, in accordance with an embodiment of the technology, whenever an expression that is not already encoded by the token tree is added to the token tree. The added branch may branch off from an existing node, at the bit location where a first bit in the sequence of bits representing the expression does not exist in the binary search tree. The addition of branches to encode additional expressions is subsequently discussed with reference to FIGS. 2A-2D.

In the exemplary token trees (240A-240D), each character of an expression is encoded using eight bits. For example, the expression "0" is encoded by the bit sequence "00110010", "a" is encoded by the bit sequence "01100001", and "b" is encoded by the bit sequence "01100010". Accordingly, when adding an expression to a token tree, the expression is treated on a bit-level.

Consider the token tree (240A) in FIG. 2A. The token tree encodes the expression "0" (246A.1). As previously discussed, the bit sequence for "0" is "00110010". Because the only encoded expression in the token tree (240A) is "0", the encoded expression is represented by a single key node that includes the bit sequence "00110010". No branch nodes are necessary because only a single expression is encoded. Accordingly, the token tree, organized from top to bottom, terminates in a single branch. By descending through the token tree, the bit sequence "00110010", which stands for the expression "0" is obtained.

Turning to FIG. 2B, a token tree (240B) with two branches is shown. The token tree encodes the two expressions "0" (246B.1) and "ab" (246B.2). The token tree (240B) is obtained from the token tree (240A) of FIG. 2A by adding the expression "ab" (246B.2). The expression is added as follows. First, the bit sequence for "ab" is obtained. The bit sequence for "ab" is "0110000101100010". Next, the bit sequence for "ab" is integrated into the existing token tree. The integration is performed by stepping through the bit sequence of the expression for "ab" in consecutive order. If a matching bit already exists in the token tree, the branch of that matching bit is followed. If a matching bit does not yet exist, a branch node is established to accommodate a new branch in the token tree. In the example of adding the expression "ab" to the token tree (240A), the first bit of "ab" is zero, which matches the first bit of the token tree. Accordingly, the existing branch of the token tree is followed downward. The second bit of "ab" is "1", which does not match the second bit of the token tree. Accordingly, the existing key node (242A.1) of the token tree (240A) is broken up to insert a branch node at the second bit location. The branch node, followed to the left, includes an additional key node such that the left branch of the token tree (consisting of the key node (242B.1), the branch node (244B.1) and the key node (242B.2)) encodes the expression "0". An additional key node (242B.3) is attached to the right of the branch node (244B.1) such that the right branch (consisting of the key node (242B.1), the branch node (244B.1) and the key node (242B.3)) encodes the expression "ab".

Turning to FIG. 3C, a token tree (240C) with three branches is shown. The token tree encodes the expressions "1" (246C.1), "0" (246C.2), and "ab" (246C.3). The token tree (240C) is obtained from the token tree (240B) of FIG. 2B by adding the expression "1" (246C.1). The expression is added as follows.

First, the bit sequence for "1" is obtained. The bit sequence for "1" is "00110001". Next, the bit sequence for "1" is integrated into the existing token tree. The integration is performed by stepping through the bit sequence of the expression for "1" in consecutive order. It is found that bits 1-6 match the bits on the branch for the expression "0". However, bit 7 deviates. Accordingly, a branch node (244C.2) is established to accommodate a new branch in the token tree. The resulting token tree (240C) has three branches that encode the expressions "1" (246C.1), "0" (246C.2), and "ab" (246C.3).

Turning to FIG. 3D, a token tree (240D) with four branches is shown. The token tree encodes the expressions "1" (246D.1), "0" (246D.2), "ab" (246D.3), and "a" (246D.4). The token tree (240D) is obtained from the token tree (240C) of FIG. 2C by adding the expression "a" (246D.4). The expression is added as follows.

First, the bit sequence for "a" is obtained. The bit sequence for "a" is "01100001". Next, the bit sequence for "a" is integrated into the existing token tree. The integration is performed by stepping through the bit sequence of the expression "a" in consecutive order. It is found that the bit sequence for "a" matches bits 1-8 on the branch that represents the expression "ab". Accordingly the branch encoding "ab" is split. The resulting first branch has only 8 bits that encode the expression "a" (246D.4). the resulting second branch has 16 bits that encode the expression "ab" (246D.3).

Those skilled in the art will recognize that other representations may alternatively be used to store expressions in token trees (240A-240D). For example, the encoding of expressions is not necessarily limited to a binary representation. Further, other forms of binary search trees, or even non-search-tree-like structures may be used to store expressions. For example, the expressions may be stored in sorted or non-sorted lists, arrays of sorted or non-sorted lists, etc.

Figure 3:
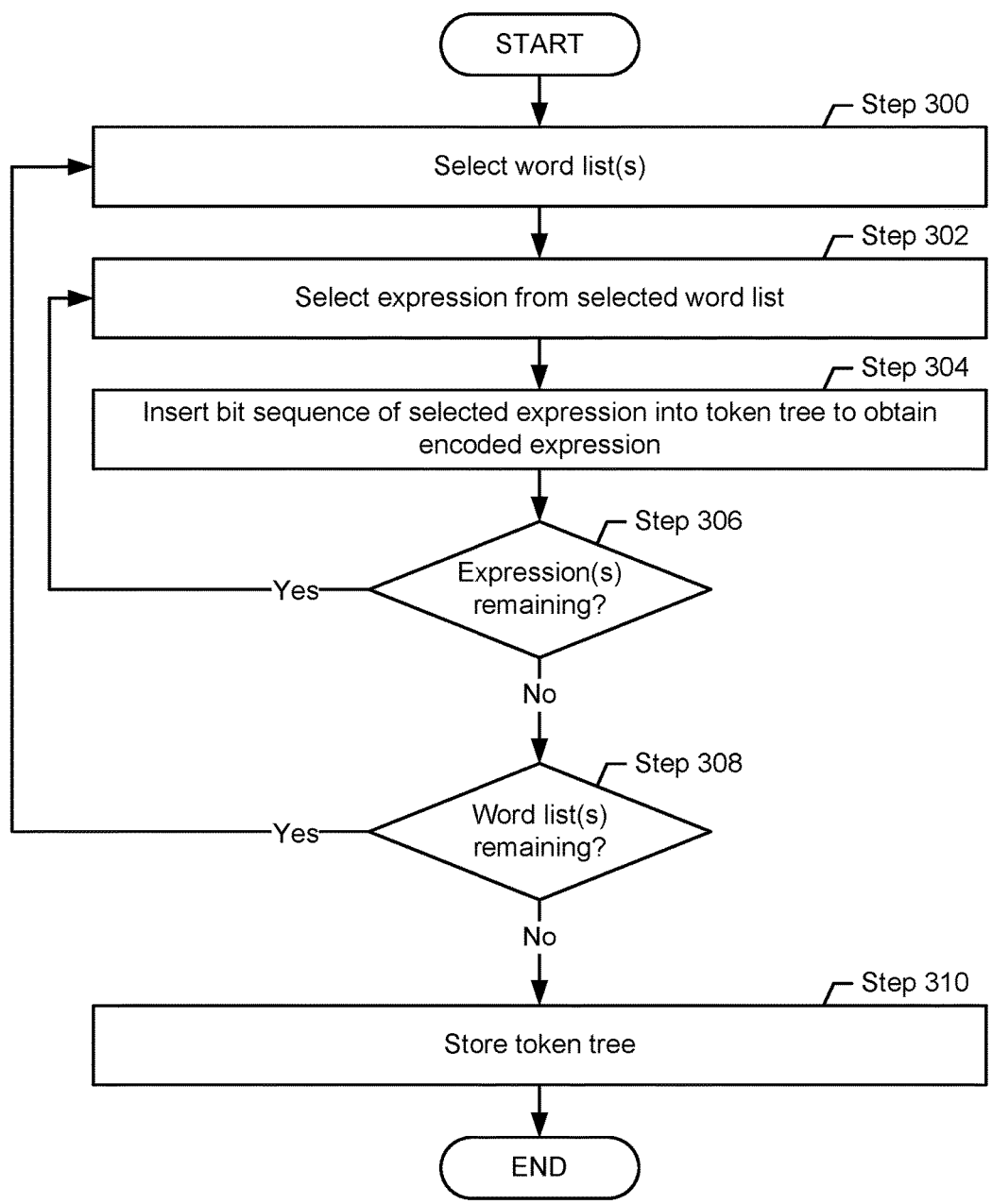
FIGS. 3 and 4 show flowcharts in accordance with one or more embodiments of the technology.
Figure 4:
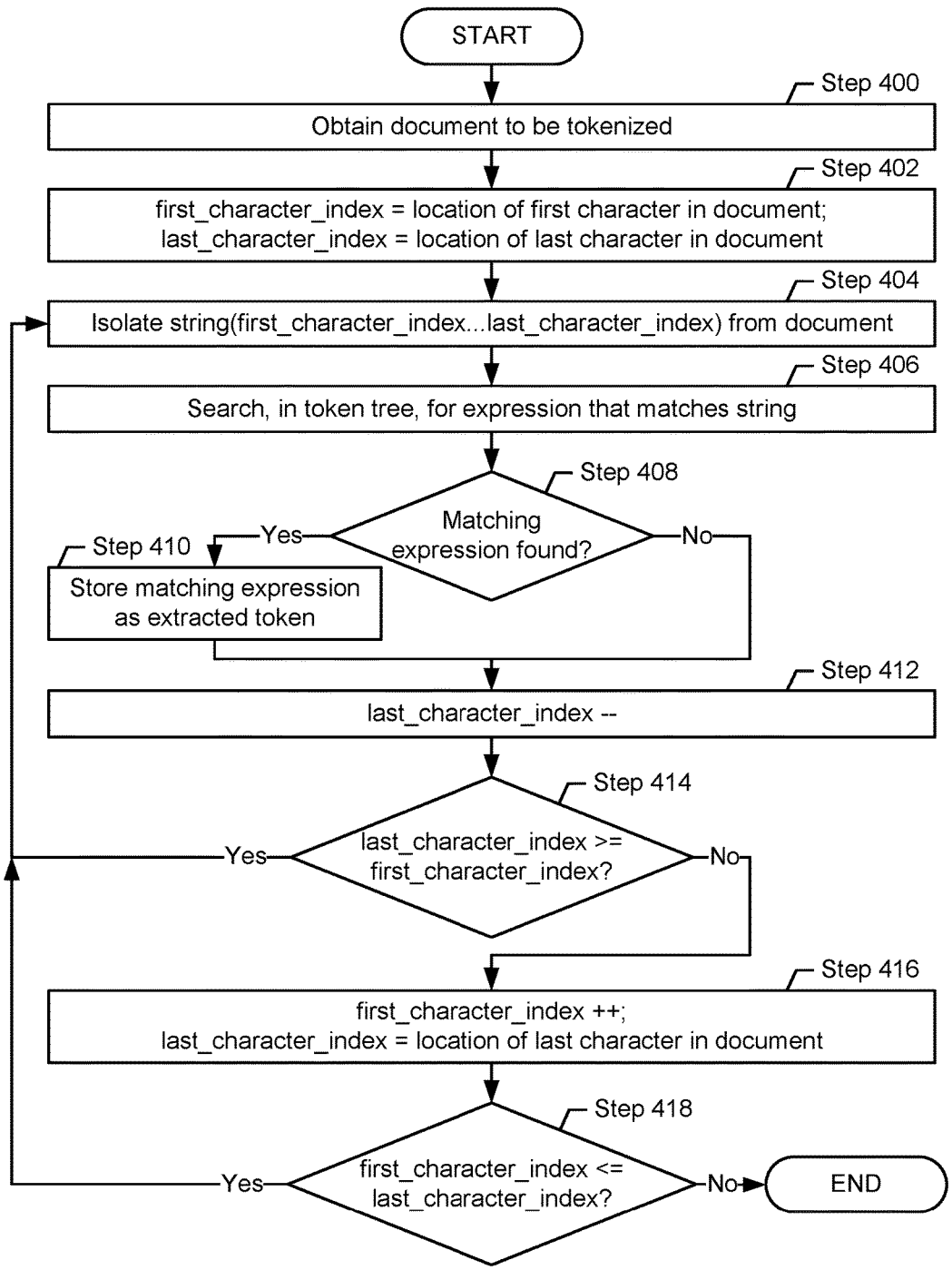

FIGS. 3 and 4 show methods for tokenizing documents, in accordance with one or more embodiments of the technology. FIG. 3 describes the generation of a token tree. The generation of the token tree is a prerequisite for the tokenization of documents, described in FIG. 4.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3 and 4 may be performed in parallel with any other steps shown in FIGS. 3 and 4 without departing from the technology.

FIG. 3 shows a method for generating a token tree, based on a set of expressions included in one or more word lists. The steps shown in FIG. 3 may be executed once the underlying word lists become available, e.g., when a user selects word lists to be used. The selection of word lists may be based on requirements of the tokenization. For example, if the document to be tokenized includes certain languages, word lists that include expressions in these languages may be selected. The method of FIG. 3 may be executed only once, and the resulting token tree may be relied upon for the tokenization of multiple documents. Alternatively, some or all steps may be executed repeatedly, for example, to add additional expressions to an existing token tree. Further, all steps may be repeatedly executed if different token trees are to be used for the tokenization of different documents. Generally, the addition of expressions to a token tree may be performed iteratively, for example, by stepping through the expressions in a word list until all expressions in the word list have been added to the token tree. Next, all expressions stored in another word list are added to the token tree, and the above steps may be repeated until all expressions in all word lists have been added.

Turning to FIG. 3, in Step 300, a word list is selected from the word lists to be incorporated in the token tree. The selection may be performed based on the name of the word list (e.g., in alphabetical order), randomly, or in any other way.

In Step 302, an expression to be added to the token tree is selected from the word list selected in Step 300. The selection may be performed, for example, based on the order in which expressions are stored in the word list, or in any other way.

In Step 304, the expression selected in Step 302 is inserted into the token tree. As previously described with reference to FIGS. 2A-2D, an expression is encoded by a series of bits. Accordingly, the insertion of the expression results in the addition of key and/or branch nodes, as previously described, thereby establishing an additional branch of the token tree.

In Step 306, a determination is made about whether additional expressions to be added to the token tree are remaining in the selected word list. If additional expressions are remaining, the method may return to Step 302, to continue adding expressions to the token tree. If no additional expressions are remaining, the method may proceed to Step 308.

In Step 308, a determination is made about whether additional word lists are remaining. If one or more additional word lists are remaining, the method may return to Step 300 to add expressions from the remaining word list(s) to the token tree. If no additional word lists are remaining, the method may proceed to Step 310.

In Step 310, the token tree with the encoded expressions is stored. The token tree may be temporarily stored in volatile memory (e.g., in random access memory), or it may be permanently stored in non-volatile memory (e.g. on a hard disk drive, in flash memory, etc.).

FIG. 4 shows a method for tokenizing a document, based on the token tree generated as described in FIG. 3. The steps shown in FIG. 4 may be executed each time a document is to be tokenized. Generally, the method of FIG. 4 isolates a string from the document, and searches the token tree for a matching expression. Next, a different string is isolated in the document, and the token tree is searched for this string. In one embodiment of the technology, the strings are isolated in a systematic manner, controlled by string-delimiting variables (e.g. pointers) that define size and location of the string within the document. An entire document may be tokenized by repeating these steps until all possible strings within the document have been searched for in the token tree.

Turning to FIG. 4, in Step 400, the document to be tokenized is obtained. The document may be obtained from a user or a process requesting the tokenization of the document. As previously discussed, the document to be tokenized may be any type of document that includes text content, but that may, in addition, also include non-text content.

In Step 402, a set of variables to be used for defining a string within the document are initialized. first_character_index is set to the location of the first character of the document, and last_character_index is set to the location of the last character of the document. Alternatively, if the tokenization of only a part of the document is desired, first_character_index and last_character_index may be set to delimit the part of the document to be tokenized, rather than spanning the entire document. Those skilled in the art will recognize that first_character_index and last_character_index may be set in any way to delimit a text passage of any size and/or at any location within the document.

In Step 404, the string, delimited by first_character_index and last_character_index, is isolated. The string may include individual characters, sentences, paragraphs or the entire document content. The string may include content in a single language or it may include content in multiple languages. For example, the string may include sections of English language text, Chinese language text, and Japanese language text.

In Step 406, a search is performed in the token tree to locate an expression that matches the string. The string, in order to perform the search, is considered on a bit-level, i.e., the series of bits representing the characters of the string, is compared to the series of bits that represent expressions in the token tree. The search is performed by following the nodes of the token tree in descending order. If the end of a branch is reached, indicating that all bits of the string and all bits of the branch match, the string is considered to match the expression encoded by the branch of the token tree. If not all bits match, and the end of a branch is therefore not reached, the string is considered not to correspond to any of the expressions encoded in the token tree. In one embodiment of the technology, the encoding used for the token tree and for the string is required to match. For example, the string and the token tree may be encoded using UTF-16. If there is a mismatch between the encodings, a re-encoding of the string and/or the token tree may be performed to obtain a common encoding, prior to performing Step 406.

In Step 408, a determination is made about whether a matching expression was found, based on the parsing of the token tree, described in Step 406. If a matching expression was found, the method may proceed to Step 410, where the matching expression is stored as a token extracted from the document. If no matching expression was found, the method may proceed to Step 412.

In Step 412, last_character_index is decremented. In Step 414, a determination is made about whether last_character_index is greater than or equal to first_character_index to test whether the string delimited by first_character_index and last_character_index includes at least one character. If last_character_index is greater than or equal to first_character_index, the method may return to Step 404 to repeat Steps 404-412 for the shortened string. If a determination is made that last_character_index is less than first_character_index, it is concluded that the string delimited by first_character_index and last_character_index does not include any characters, and as a result the method proceeds to Step 416.

In Step 416, first_character_index is incremented, and last_character_index is reset to the location of the last character in the document. Accordingly, a string delimited by the updated first_character_index and last_character_index corresponds to the string used in the previous iteration, less the first character.

In Step 418, a determination is made about whether first_character_index is less than or equal to last_character_index to test whether the string delimited by first_character_index and last_character_index includes at least one character. If first_character_index is less than or equal to last_character_index, the method may return to Step 404 to repeat Steps 404-412 for the shortened string. If a determination is made that first_character_index is greater than last_character_index, it is concluded that the string delimited by the updated first_character_index and last_character_index does not include any characters, and as a result the execution of the method may terminate because no additional strings to be tokenized remain in the document.

Those skilled in the art will recognize that details of the method for tokenizing a document may vary, without departing from the technology. For example, the method may progress from initially evaluating a single character string to evaluating increasingly longer strings, rather than starting with a long string that is incrementally shortened, as described in FIG. 4.

The subsequently described use case scenario is intended to provide an example of the method for tokenizing documents, described in FIGS. 3 and 4. The use case is for illustrative purposes only, and the methods described by FIGS. 3 and 4 are not limited to the use case described below.

Assume that a document includes the following multilingual text: "南京市 长江大 桥请Tom 食べる bananasapplesoranges حبالممر عالم 안보세요 세계이 보세요"

The above text is encoded using UTF-16. The character "南" in UTF-16 is represented by the bit sequence "01010011 01010111", the character "京" is represented by the bit sequence "01001110 10101100", etc. Accordingly, the entire text is represented by a bit pattern beginning with the bit sequence "01010011 01010111 01001110 10101100". Each of the characters in the text is represented by a sequence of 16 bits.

Further assume that a set of word lists exists. There is one Chinese language word list, one English language word list, one Japanese language word list, one Arabic language word list and one Korean language word list. A single token tree was generated from these word lists, as described in FIG. 3. The token tree also uses UTF-16 to encode the expressions obtained from the word lists.

As the method of FIG. 4 is executed, in the first iteration, the entire text is included in the string. No matching expression is found in the token tree because no single entry exists in the token tree for the mix of Chinese, English, Japanese, Arabic and Korean expressions. After multiple iterations of Steps 404-414, the string includes only the Chinese characters "南京市 长江大 桥请". No match is found because the token tree does not include a matching eight character expression (128 bit) expression. In the next iteration, the last character "请" is dropped. Accordingly, the string "南京市 长江大桥" is considered. A matching expression is found in the token tree because the 112 bit sequence "01010011 01010111 01001110 10101100 01011110 00000010 10010101 01111111 01101100 01011111 01011001

00100111 01101000 01100101" that represents the expression "南京市 长江大桥" was provided in the Chinese language word list. Accordingly, "南京市 长江大桥" is stored as an extracted token.

Subsequently, the character "桥" is dropped, and the string "南京市 长江大" is considered. No matching expression is found in the token tree. More characters are dropped until the string to be considered is "南京市长". A matching expression is found in the token tree because the 64 bit sequence "01010011 01010111 01001110 10101100 01011110 00000010 10010101 01111111" that represents the expression "南京市长" was provided in the Chinese language word list, and accordingly the extracted token "南京市长" is stored. With the subsequent dropping of additional characters, the following expressions are detected and stored as extracted tokens: "南京市", "南京", "南".

In subsequent iterations, the original string without the first character is considered (Step 416), and all expressions that exist in the token tree are stored as extracted tokens. Next, the first and the second characters are dropped from the original string, etc.

After execution of the entire method of FIG. 4, the following extracted tokens are found in the following order: "南京市长江大桥", "南京市长", "南京市", "南京", "南", "京", "市", "长江", "长", "江大桥", "江", "大桥", "大", "桥", "食べる", "bananas", "banana", "ban", "ananas", "ana", "an", "ana", "an", "as", "sap", "apples", "apple", "so", "oranges", "orange", "orang", "or", "ranges", "range", "rang", "ran", "an", "عالم", "여보세요", "여보", "세요", "세계", "여보세요", "여보", "세요". These expressions were detected because they were provided in the word lists that were used to generate the token tree.

Embodiments of the technology may enable a system to tokenize documents. The tokenization is based on a token tree in which expressions are encoded. During the tokenization, the token tree is searched for expressions that match strings selected from the document. Matching expressions are saved as extracted tokens. The token tree may accommodate expressions in any language. Accordingly, the method for tokenization of documents may be particularly suitable for tokenizing multilingual documents. Because any expression provided in a word list may be recognized in the document during the tokenization, the method may be suitable for the tokenization of text content of any type. For example, the text content may include special characters, spaces, etc.

The tokenization in accordance with one or more embodiments of the technology may be performed efficiently, due to the search tree-like characteristics of the token tree. A tokenization, even of large documents and/or using large word lists may thus be rapidly completed. For example, the generation of a token tree and the tokenization of a document, using a 2GB word list that includes 70,000,000 expressions can be completed within minutes, even on a regular laptop personal computer.

The tokenization, in accordance with one embodiment of the technology may be provided as a service. A user of the service may, for example, upload a document and/or one or more word lists, and may then receive the result of the tokenization in the form of extracted tokens.

Embodiments of the technology may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (500) may be located at a remote location and connected to the other elements over a network (512). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for tokenizing documents, the method comprising:
obtaining a document comprising text to be tokenized;
isolating a first string of consecutive characters in the document;
generating a plurality of strings based on the first string, wherein generating the plurality of strings comprises:
(a) dropping the last character of a copy of the first string to obtain a modified first string, (b) adding the modified first string to the plurality of strings, (c) dropping the last character of the modified first string to obtain a second modified first string, (d) adding the second modified first string to the plurality of strings, (e) repeating (c) and (d) until the second modified first string does not include any characters, (f) dropping the first character of a second copy of the first string to obtain a third modified first string, (g) dropping the last character of the third modified first string to obtain a fourth modified first string, (h) adding the fourth modified first string to the plurality of strings, and (i) repeating (g) and (h) until the third modified first string does not include any characters;

searching, in a token tree, for expressions that match respective strings of the plurality of strings to obtain matching expressions; and store the matching expressions as extracted tokens, wherein the token tree comprises branches corresponding to different expressions, wherein a branch of the branches of the token tree comprises a plurality of nodes, wherein each of the plurality of nodes corresponds to a respective bit of a binary representation of an expression of the different expressions corresponding to the branch, wherein reading each branch of the branches from a top to a bottom of the token tree obtains a single expression of the different expressions, wherein searching for the expression that matches the respective strings comprises reading a branch of the branches.

2. The method of claim 1, wherein the first string of consecutive characters includes all characters of the document.

3. The method of claim 1, wherein the first string comprises multilingual text.

4. The method of claim 1, wherein the cardinality of the branches from the top to the bottom of the token tree corresponds to the cardinality of the different expressions in the token tree.

5. The method of claim 1, wherein the token tree is multilingual.

6. The method of claim 1, wherein the token tree uses the 16-bit Unicode Transformation Format (UTF-16) to encode the expressions.

7. The method of claim 1, wherein the branch includes at least two nodes of the plurality of nodes that are also included in a second branch of the branches, wherein the two nodes are key nodes, wherein all key nodes of the plurality of nodes have the same value, wherein the branch includes a second node of the plurality of nodes corresponding to a difference in the binary representations of two expressions of the different expressions corresponding to the branch and the second branch, wherein the second node is adjacent to the at least two nodes, wherein remaining nodes of the branch that follows the second node do not correspond to the second branch.

8. A system for tokenizing documents, comprising:
a computing device comprising a document tokenization engine that:
obtains a document comprising text to be tokenized;
isolates a first string of consecutive characters in the document;

generates a plurality of strings based on the first string, wherein generating the plurality of strings comprises:

(a) dropping the last character of a copy of the first string to obtain a modified first string, (b) adding the modified first string to the plurality of strings, (c) dropping the last character of the modified first string to obtain a second modified first string, (d) adding the second modified first string to the plurality of strings, (e) repeating (c) and (d) until the second modified first string does not include any characters, (f) dropping the first character of a second copy of the first string to obtain a third modified first string, (g) dropping the last character of the third modified first string to obtain a fourth modified first string, (h) adding the fourth modified first string to the plurality of strings, and (i) repeating (g) and (h) until the third modified first string does not include any characters;

searches, in a token tree, for expressions that match respective strings of the plurality of strings to obtain matching expressions; and stores the matching expressions as extracted tokens, wherein the token tree comprises branches corresponding to different expressions, wherein a branch of the branches of the token tree comprises a plurality of nodes, wherein each of the plurality of nodes corresponds to a respective bit of a binary representation of an expression of the different expressions corresponding to the branch, wherein reading each branch of the branches from a top to a bottom of the token tree obtains a single expression of the different expressions, wherein searching for the expression that matches the respective strings comprises reading a branch of the branches.

9. The system of claim 8, wherein the first string comprises multilingual text.

10. The system of claim 8 further comprising a token tree encoding engine that generates, from expressions obtained from word lists, the token tree, wherein the cardinality of the branches from the top to the bottom of the token tree corresponds to the cardinality of the different expressions in the token tree.

11. The system of claim 8, wherein the token tree is multilingual.

12. The system of claim 8, wherein the branch includes at least two nodes of the plurality of nodes that are also included in a second branch of the branches, wherein the two nodes are key nodes, wherein all key nodes of the plurality of nodes have the same value, wherein the branch includes a second node of the plurality of nodes corresponding to a difference in the binary representations of two expressions of the different expressions corresponding to the branch and the second branch, wherein the second node is adjacent to the at least two nodes, wherein remaining nodes of the branch that follows the second node do not correspond to the second branch.

13. A non-transitory computer readable medium (CRM) comprising instructions that enable a system for tokenizing documents to:
obtain a document comprising text to be tokenized;
isolate a first string of consecutive characters in the document;

generate a plurality of strings based on the first string, wherein generating the plurality of strings comprises:
- (a) dropping the last character of a copy of the first string to obtain a modified first string,
- (b) adding the modified first string to the plurality of strings,
  - (c) dropping the last character of the modified first string to obtain a second modified first string,
- (d) adding the second modified first string to the plurality of strings,
- (e) repeating (c) and (d) until the second modified first string does not include any characters,
- (f) dropping the first character of a second copy of the first string to obtain a third modified first string,
- (g) dropping the last character of the third modified first string to obtain a fourth modified first string,
- (h) adding the fourth modified first string to the plurality of strings, and
- (i) repeating (g) and (h) until the third modified first string does not include any characters;

search, in a token tree, for expressions that match respective strings of the plurality of strings to obtain matching expressions; and store the matching expressions as extracted tokens, wherein the token tree comprises branches corresponding to different expressions, wherein a branch of the branches of the token tree comprises a plurality of nodes, wherein each of the plurality of nodes corresponds to a respective bit of a binary representation of an expression of the different expressions corresponding to the branch, wherein reading each branch of the branches from a top to a bottom of the token tree obtains a single expression of the different expressions, wherein searching for the expression that matches the respective strings comprises reading a branch of the branches.

14. The non-transitory CRM of claim 13, wherein the cardinality of the branches from the top to the bottom of the token tree corresponds to the cardinality of the different expressions in the token tree.

15. The non-transitory CRM of claim 13, wherein the token tree is multilingual.

16. The non-transitory CRM of claim 13, wherein the branch includes at least two nodes of the plurality of nodes that are also included in a second branch of the branches, wherein the two nodes are key nodes, wherein all key nodes of the plurality of nodes have the same value, wherein the branch includes a second node of the plurality of nodes corresponding to a difference in the binary representations of two expressions of the different expressions corresponding to the branch and the second branch, wherein the second node is adjacent to the at least two nodes, wherein remaining nodes of the branch that follows the second node do not correspond to the second branch.

* * * * *